US010348727B2

(12) United States Patent
Adam et al.

(10) Patent No.: US 10,348,727 B2
(45) Date of Patent: Jul. 9, 2019

(54) AUTOMATIC KEY MANAGEMENT USING ENTERPRISE USER IDENTITY MANAGEMENT

(71) Applicant: International Business Machines Corporation, Armonk, NY (US)

(72) Inventors: Constantin M. Adam, Yorktown Heights, NY (US); Milton H. Hernandez, Yorktown Heights, NY (US); Vugranam C. Sreedhar, Yorktown Heights, NY (US); Prema Vivekanandan, Kansas City, MO (US)

(73) Assignee: International Business Machines corporation, Armonk, NY (US)

( * ) Notice: Subject to any disclaimer, the term of this patent is extended or adjusted under 35 U.S.C. 154(b) by 0 days.

(21) Appl. No.: 14/621,852

(22) Filed: Feb. 13, 2015

(65) Prior Publication Data
US 2016/0241558 A1 Aug. 18, 2016

(51) Int. Cl.
H04L 29/06 (2006.01)
H04L 29/08 (2006.01)

(52) U.S. Cl.
CPC ...... *H04L 63/0876* (2013.01); *H04L 63/0823* (2013.01); *H04L 63/0272* (2013.01);
(Continued)

(58) Field of Classification Search
CPC .................................................. H04L 63/0876
See application file for complete search history.

(56) References Cited

U.S. PATENT DOCUMENTS 6,154,543 A 11/2000 Baltzley
6,694,025 B1 * 2/2004 Epstein ................... H04L 9/083
380/277

(Continued)

FOREIGN PATENT DOCUMENTS

CN 1759564 A 4/2006
CN 101951315 A 1/2011
CN 102013980 A 4/2011

OTHER PUBLICATIONS

T. Ylonen et al.; "The Secure Shell (SSH) Transport Layer Protocol"; Jan. 2006; Network Working Group; The Internet Society; whole document (33 pages).

(Continued)

*Primary Examiner* — John B King
*Assistant Examiner* — Darshan I Dhruv
(74) *Attorney, Agent, or Firm* — Harrington & Smith

(57) ABSTRACT

A method forms a key pair for a user. The key pair has a public key and a private key that is unique to the user and that is encrypted using a passphrase formed from an enterprise password of the user and an identification that uniquely identifies in the enterprise a device by which the user gains access. The method stores the private key in the user device and stores the public key in an enterprise server that is accessed by the user. The method provides the private key from the user device to a client, such as a SSH client, in conjunction with the password and the identification, decrypts the private key to obtain the decrypted password and the identification, and allows the user to access the enterprise server only if the decrypted password and the identification match the password and the identification provided with the private key.

9 Claims, 3 Drawing Sheets

(52) U.S. Cl.
CPC .......... *H04L 63/045* (2013.01); *H04L 63/061* (2013.01); *H04L 63/083* (2013.01); *H04L 63/168* (2013.01); *H04L 67/08* (2013.01)

(56) References Cited

U.S. PATENT DOCUMENTS

| | | | |
|---|---|---|---|
| 7,299,412 B1* | 11/2007 | Hull | G06F 16/20 |
| | | | 715/234 |
| 7,409,061 B2* | 8/2008 | Newcombe | A63F 13/12 |
| | | | 380/251 |
| 7,921,292 B1 | 4/2011 | Pauker et al. | |
| 8,006,280 B1 | 8/2011 | Hildebrand et al. | |
| 8,458,741 B2* | 6/2013 | Xiong | H04N 21/6334 |
| | | | 725/30 |
| 8,613,070 B1* | 12/2013 | Borzycki | G06F 21/6218 |
| | | | 726/8 |
| 8,719,952 B1* | 5/2014 | Damm-Goossens | |
| | | | H04L 9/0825 |
| | | | 380/285 |
| 9,654,469 B1 | 5/2017 | Yang | |
| 9,756,033 B2 | 9/2017 | Isozaki | |
| 2002/0029350 A1 | 3/2002 | Cooper et al. | |
| 2002/0144109 A1 | 10/2002 | Benantar et al. | |
| 2003/0163701 A1* | 8/2003 | Ochi | H04L 9/083 |
| | | | 713/175 |
| 2004/0268120 A1 | 12/2004 | Mirtal et al. | |
| 2006/0161635 A1* | 7/2006 | Lamkin | G06F 16/4387 |
| | | | 709/217 |
| 2006/0198517 A1 | 9/2006 | Cameron et al. | |
| 2006/0239254 A1 | 10/2006 | Short et al. | |
| 2007/0208834 A1* | 9/2007 | Nanamura | G06F 9/46 |
| | | | 709/220 |
| 2009/0025080 A1 | 1/2009 | Lund et al. | |
| 2009/0063849 A1* | 3/2009 | Doyle | H04L 29/12839 |
| | | | 713/151 |
| 2009/0150991 A1 | 6/2009 | Hoey et al. | |
| 2009/0161877 A1* | 6/2009 | DeCusatis | H04L 9/32 |
| | | | 380/282 |
| 2009/0165096 A1* | 6/2009 | Hughes | H04L 63/08 |
| | | | 726/5 |
| 2010/0204989 A1* | 8/2010 | Boes | G10L 15/285 |
| | | | 704/235 |
| 2011/0016318 A1* | 1/2011 | Syngkon | G06Q 10/08 |
| | | | 713/170 |
| 2011/0252243 A1 | 10/2011 | Brouwer et al. | |
| 2011/0252459 A1* | 10/2011 | Walsh | G06F 21/33 |
| | | | 726/4 |
| 2011/0296172 A1* | 12/2011 | Fu | H04L 9/0825 |
| | | | 713/156 |
| 2011/0307937 A1 | 12/2011 | Hildebrand et al. | |
| 2012/0019379 A1* | 1/2012 | Ben Ayed | G08B 13/1436 |
| | | | 340/539.1 |
| 2012/0150750 A1* | 6/2012 | Law | G06O 20/20 |
| | | | 705/76 |
| 2012/0308012 A1* | 12/2012 | Yoon | H04L 9/0847 |
| | | | 380/282 |
| 2013/0029641 A1* | 1/2013 | Hickie | G06F 21/604 |
| | | | 455/411 |
| 2013/0117554 A1* | 5/2013 | Ylonen | H04L 9/08 |
| | | | 713/151 |
| 2013/0129087 A1 | 5/2013 | Qi et al. | |
| 2014/0143548 A1 | 5/2014 | Wang | |
| 2014/0281514 A1* | 9/2014 | Erofeev | G06F 21/6218 |
| | | | 713/165 |
| 2014/0281545 A1* | 9/2014 | Erofeev | G06F 21/6218 |
| | | | 713/171 |
| 2014/0282897 A1* | 9/2014 | Stuntebeck | H04L 63/08 |
| | | | 726/4 |
| 2014/0331060 A1 | 11/2014 | Hayton | |
| 2015/0172292 A1* | 6/2015 | Kuang | H04L 63/0884 |
| | | | 713/155 |
| 2015/0222604 A1* | 8/2015 | Ylonen | H04L 63/062 |
| | | | 713/171 |
| 2015/0304292 A1* | 10/2015 | Dulkin | H04L 63/0281 |
| | | | 726/7 |
| 2016/0134906 A1* | 5/2016 | James | H04N 21/23103 |
| | | | 725/110 |

OTHER PUBLICATIONS

International Search Report, International Application No. PCT/IB2016/050498, dated May 17, 2016, 12 pages.

\* cited by examiner

3A: FORMING A KEY PAIR FOR A USER, THE KEY PAIR COMPRISING A PUBLIC KEY AND A PRIVATE KEY THAT IS UNIQUE TO THE USER AND THAT IS ENCRYPTED USING A PASSPHRASE COMPRISED OF AN ENTERPRISE PASSWORD OF THE USER AND AN IDENTIFICATION THAT UNIQUELY IDENTIFIES IN THE ENTERPRISE A DEVICE BY WHICH THE USER ACCESSES THE ENTERPRISE

3B: STORING THE PRIVATE KEY IN THE USER DEVICE AND STORING THE PUBLIC KEY IN AT LEAST ONE ENTERPRISE SERVER THAT IS ACCESSED BY THE USER

3C: PROVIDING THE PRIVATE KEY FROM THE USER DEVICE TO THE SSH CLIENT IN CONJUNCTION WITH THE PASSWORD AND THE IDENTIFICATION, DECRYPTING THE PRIVATE KEY TO OBTAIN THE DECRYPTED PASSWORD AND THE IDENTIFICATION, AND ALLOWING THE USER TO ACCESS THE ENTERPRISE SERVER ONLY IF THE DECRYPTED PASSWORD AND THE IDENTIFICATION MATCH THE PASSWORD AND THE IDENTIFICATION PROVIDED WITH THE PRIVATE KEY

3D: STORING IN A MEMORY USER INFORMATION COMPRISING AT LEAST THE ENCRYPTED PRIVATE KEY, THE PUBLIC KEY, THE IDENTIFICATION OF THE DEVICE, AND A LIST OF ENTERPRISE SERVERS THAT ARE ACCESSIBLE BY THE USER, THE USER INFORMATION BEING ASSOCIATED WITH AN ENTERPRISE USER IDENTIFICATION

3E: IN RESPONSE TO A CHANGE IN AT LEAST ONE OF THE ENTERPRISE PASSWORD OF THE USER AND THE IDENTIFICATION THAT UNIQUELY IDENTIFIES THE DEVICE, FORMING A NEW KEY PAIR FOR THE USER USING THE CHANGED AT LEAST ONE OF THE ENTERPRISE PASSWORD AND THE IDENTIFICATION, AND STORING A RESULTING NEW PRIVATE KEY IN THE USER DEVICE AND STORING THE RESULTING NEW PUBLIC KEY IN THE ENTERPRISE SERVER

3F: IN RESPONSE TO A CHANGE IN A STATUS OF THE USER IN THE ENTERPRISE, IDENTIFYING FROM A LIST OF SERVERS THOSE ENTERPRISE SERVERS THAT THE USER COULD ACCESS, AND REMOVING THE PUBLIC KEY OF THE USER FROM ALL ENTERPRISE SERVERS IN THE LIST

FIG. 3

AUTOMATIC KEY MANAGEMENT USING ENTERPRISE USER IDENTITY MANAGEMENT

TECHNICAL FIELD

The embodiments of this invention relate generally to data processing systems, software and methods that enable a user to securely access a server through a communication network using an authentication key pair.

BACKGROUND

Key-based authentication is generally considered to be more secure than password-based authentication. Certain tools such as the Secure Shell (SSH) provide support for both key based authentication and password-based authentication. A general reference to SSH can be made, for example, to RFC 4253, "The Secure Shell (SSH) Transport Layer Protocol", T. Ylonen and C. Lonvick, 2006.

To aid in validating identities SSH has key management capability and related agents. When configured with public key authentication, the key proves the user's identity to remote SSH hosts. An SSH-based identity consists of two parts: a public key and a private key. The private SSH key is the user's identity for outbound SSH connections and should be kept confidential. When a user initiates an SSH or SCP session to a remote host or server, he or she gains access to the remote host or server via a SSH client.

Private keys should never leave a client and should be encrypted using a "passphrase". When private keys are lost or stolen new key pairs should be regenerated, and an enterprise can disable all password-based SSH authentication.

The management of private and public keys (key pairs) used by tools such as SSH is important to ensure enterprise security and compliance. A large enterprise, such as a corporation, a for-profit or a not-for-profit organization, or a governmental agency, can typically need to track some millions of key pairs. Misappropriated private keys thus can represent is a large security risk for the enterprise. Further, when a user who owns a private key leaves the enterprise it is important to invalidate/eliminate any corresponding public key stored on a server or servers of the enterprise. As a general rule, private keys should not be shared and ideally should be prevented from being shared Currently available tools and techniques for key management do not adequately address these and other issues.

SUMMARY

In accordance with a non-limiting aspect of this invention there is provided a method that comprises forming a key pair for a user, the key pair comprising a public key and a private key that is unique to the user and that is encrypted using a passphrase comprised of an enterprise password of the user and an identification that uniquely identifies in the enterprise a device by which the user accesses the enterprise; and storing the private key in the user device and storing the public key in at least one enterprise server that is accessed by the user.

In accordance with another non-limiting aspect of this invention there is provided a system comprised of at least one data processor connected with at least one memory that stores software instructions. In the system the execution of the software instructions by the at least one data processor causes the system to form a key pair for a user, the key pair comprising a public key and a private key that is unique to the user and that is encrypted using a passphrase comprised of an enterprise password of the user and an identification that uniquely identifies in the enterprise a device by which the user accesses the enterprise; and store the private key in the user device and storing the public key in at least one enterprise server that is accessed by the user.

In accordance with yet another non-limiting aspect of this invention there is provided a computer program product comprised of software instructions on a computer-readable medium. Execution of the software instructions using a computer results in performing operations that comprise forming a key pair for a user, the key pair comprising a public key and a private key that is unique to the user and that is encrypted using a passphrase comprised of an enterprise password of the user and an identification that uniquely identifies in the enterprise a device by which the user accesses the enterprise; and storing the private key in the user device and storing the public key in at least one enterprise server that is accessed by the user.

BRIEF DESCRIPTION OF THE SEVERAL VIEWS OF THE DRAWINGS

FIG. 3 illustrates a logic flow diagram (flow chart) in accordance with an example of an embodiment of a method of this invention, as well as a result of execution of computer software in accordance with embodiments of this invention.

DETAILED DESCRIPTION

Figure 1:
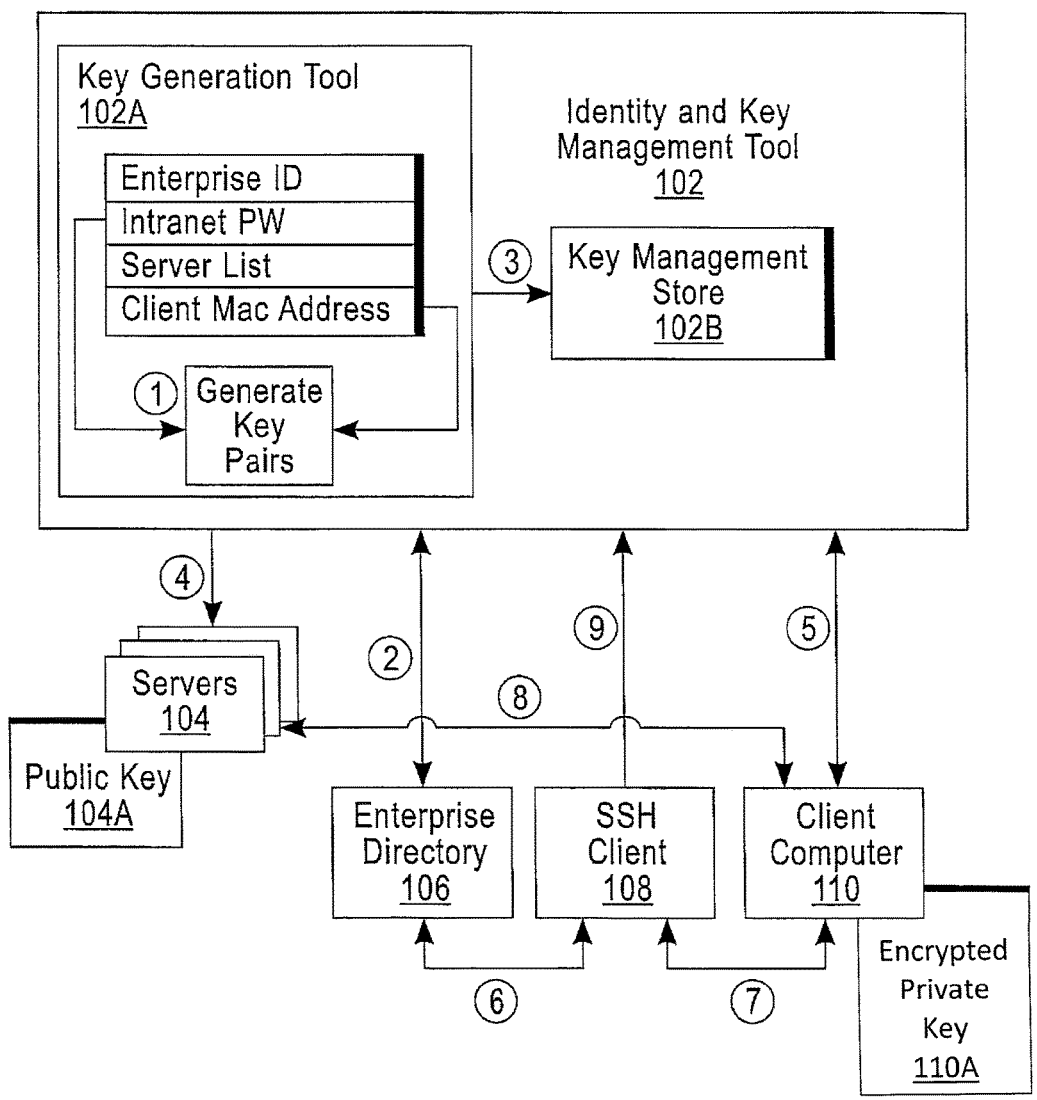
FIG. 1 is a block diagram and a signal flow diagram of a system that can embody the key management teachings of this invention.

By way of an introduction, key management should ideally be as seamless as enterprise user identification (id) and password management. As in the case of the typical enterprise password expiration policy, ideally a user's security key or keys should expire whenever the user's enterprise password expires. Further, it would be preferable if an enterprise user would need to remember just one password and would need to own just one private key. Further, if a user would need more than one private key then ideally all private keys associated with that user should expire if, for example, the user was no longer associated with the enterprise. Further still, when an enterprise password expires it could be desirable that any corresponding private key(s) should also expire. Also, if a user obtains a new device or the user's device is misplaced or stolen the private key should also expire.

As considered herein a private key is unique to a user (at least within an enterprise or organization of interest), that is, a private key can be owned by no more than a single user (of the enterprise or organization). In addition, it is typically the case that the private key is valid on a small set of devices and these devices are also owned and/or controlled by the same user.

The accountability of keys is an important security consideration as the enterprise may need to track all keys due to audit and/or compliance requirements. The enterprise should also be able to track the ownership of keys (both private and public keys). Furthermore, if an enterprise needs to keep track of private keys then encrypted private keys should preferably be stored on client computers, that is, on those computing devices through which enterprise users access servers associated with the enterprise. These considerations can also be important when the enterprise provides third party services such as public cloud services. In general, enterprise user key management should be based on well-defined application program interfaces (APIs).

It can be instructive to compare various key-based and password-based authentication approaches. For example, for SSH key authentication the private key is never sent over the wire (i.e., is never exposed) and authentication is based on what the user has (the key). A single private key can be used to login to multiple servers. The private key can be misappropriated however and thus should be secured, such as by using a passphrase. In general, private keys are controlled by clients whereas public keys are controlled by servers. Private keys can also be used restrict the execution of certain commands and can also be used to accomplish a non-interactive login.

For the case of SSH password authentication the user's password is sent over the wire for server authentication (the server controls the passwords). In this case the authentication is based on what the user knows (the password). Multiple passwords can be required which are typically recorded in clear text and are thus susceptible to being misappropriated. SSH password authentication generally does not support the restriction of commands or non-interactive login.

Security concerns can include the danger of a man in the middle attack where a password can be intercepted even on a secure channel. A brute force attack is also more likely to succeed for password authentication.

The various embodiments of this invention beneficially address and solve the foregoing and other problems.

Reference is made to FIG. 1 for showing a block diagram of a system 100 that can embody the key management teachings in accordance with various embodiments of this invention. The system 100 can be instantiated at an enterprise such as, but not limited to, a public company, a private company, a for-profit or a not-for-profit organization, or a governmental agency. In some embodiments the system 100 can be instantiated as software that runs on a computer of the enterprise, while in other embodiments the system 100 can be implemented in whole or in part in a cloud computing environment on at least one virtual machine.

The system 100 includes, in accordance with embodiments of this invention, an identity and key management system or tool 102 that includes a key generation sub-system or tool 102A and a key management store 102B. The system 100 also includes one or more servers 104, an enterprise directory 106 where information related to employees of the enterprise is stored, a SSH client 108 and at least one client computer 110. The client computer 110 is one used by an employee and can take any suitable form, such as a desktop PC, a laptop PC, or a workstation, or a mobile device such as a tablet computer or a communication device such as a smartphone. The client computer 110 can be assumed to be connected with an enterprise intranet.

In operation, and referring to the signal flow line of FIG. 1 that is labeled as '1', a user can be prompted via an API at the client computer 110 to enter the following information and then activate a "Generate Key Pairs" control or button:
a) enterprise user ID and intranet password;
b) a list of servers 104 accessed by the user where the user's public keys will be stored; and
c) the medium access control (MAC) address of the client computer 110 that will be used to establish a SSH Session with the server(s) 104. In some embodiments the MAC address can be output from the client computer 110 without direct involvement of the user.

To ensure that a private key is not shared with multiple client computers, the private key can be encrypted using the MAC address. If an enterprise does allow sharing of private keys across multiple client computers, then in another embodiment the MAC address is not used and some other mechanism that the user has, such as a unique mobile ID of the client computer 110, is employed. In any case the encryption of the private key preferably uses in part an identification of the client computer 110 that uniquely identifies the client computer in the enterprise.

Referring to the signal flow line of FIG. 1 that is labeled as '2', the key generation tool 102A verifies the accuracy of the entered enterprise ID and intranet password using the enterprise directory 106.

Assuming that this user information is correct, and referring to the signal flow line of FIG. 1 that is labeled as '3', the key generation tool 102A generates a key pair and stores the public and private keys with other related information in the key management store 102B. The enterprise user ID (e.g., employee number) can be used as a primary key for storing the information. The stored information can include, as a non-limiting example, the public key, the private key that is encrypted using the valid intranet password and, for example, the MAC address of the client computer 110, the list of applicable servers 104 that the user desires access to and the MAC address of the client computer 110 (or some other information that uniquely identifies the client computer 110 in the enterprise).

The encryption algorithm used to create the private key of the key pair could be one of as non-limiting examples, Digital Signature Algorithm (DSA) encryption, Rivest, Shamir and Adleman (RSA) encryption, or Diffie-Hellman (DH) encryption.

Referring to the signal flow line of FIG. 1 that is labeled as '4', the key generation tool 102A stores the public key 104A of the key pair on all of the listed servers 104.

Referring to the signal flow line of FIG. 1 that is labeled as '5', the key generation tool 102A then stores the encrypted private key 110A of the key pair on the client computer 110. As was explained above, the private key is encrypted using the enterprise password and the MAC address. The enterprise password and the MAC address can be considered as the 'passphrase' password for protecting the private key 110A. The private key 110A is never seen in clear text (except for the SSH client tool 108 as explained in the next step.

Note that the order of execution of the operations labeled as '4' and '5' could be reversed.

Referring to the signal flow line of FIG. 1 that is labeled as '6', at some later time when a new SSH session is needed by the user, the SSH client tool 108 (for example, one based on a modified version of a SSH client known as PuTTY) is activated and is informed of the identity of a user-selected server 104 (target server 104) to be connected to along with the encrypted private key 110A that is stored at the client computer 110. This can be accomplished by first entering the enterprise user ID and password to the SSH client 108. The SSH client 108 may verify the accuracy of the user ID and password with the enterprise directory 106.

Referring to the signal flow line of FIG. 1 that is labeled as '7', the SSH client tool 108 then decrypts the encrypted password 110A using entered MAC address of the client computer 110 and the password.

Referring to the signal flow line of FIG. 1 that is labeled as '8', and assuming that the enterprise user ID and password are verified, and that the received MAC address of the client computer 110 matches with the decrypted 'passphrase' password, the SSH client 108 establishes the SSH session with the target server 104.

Referring to the signal flow line of FIG. 1 that is labeled as '9', for a case where the password is invalid, or if the entered MAC address does not match the decrypted MAC address, the SSH client 108 does not establish the SSH session with the target server 104, but instead informs the key generation tool 102A of the failure. The key generation tool 102A may then give the user an option to regenerate the key pair.

For a case where the enterprise password has expired or has to be changed by the enterprise user for some other reason the enterprise user can be informed and can be sent a link to the key generation tool 102A. This can also occur if the user comes into possession of a new user device (e.g., a new laptop). A list of servers can be obtained and presented to the enterprise user to select all of the servers 104 that the user wishes to connect to. The client computer MAC address can also be optionally obtained.

The key management tool 102A then invalidates all of the user's public keys 104A on the servers 104 associated with the user. One suitable tool to remove the public keys 104A from the servers 104 is one known as IBM® Endpoint Manager. The key management tool 102A then regenerates the user's key pair(s), as was explained with respect to FIG. 1, using the new device MAC address and/or the user's new password.

Upon a change in the status of the user, such as when an enterprise user leaves the enterprise and no longer has a valid user password within the enterprise, or possibly if the user's role within the enterprise changes such that at least one server accessed by the user is no longer relevant to the user's new role, the key generation tool 102A can identify the set of servers 104 associated with the user and invalidate all of the public keys 104A on all of the servers 104 associated with the user.

Figure 2:
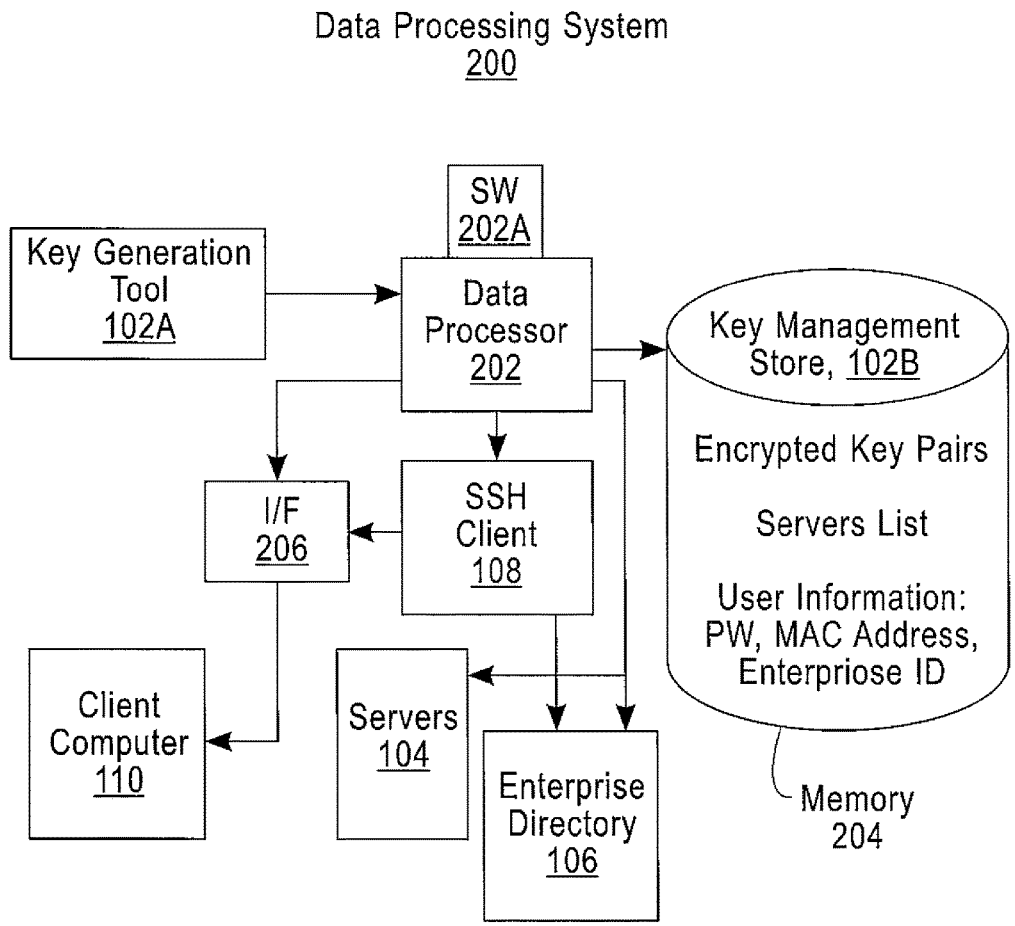
FIG. 2 presents a non-limiting example of an embodiment of a data processing system 200 can be used to realize one or more of the components of the system shown in FIG. 1.

FIG. 2 shows a non-limiting example of an embodiment of a data processing system 200 that can be used to realize one or more of the components of the system 100 shown in FIG. 1. For example, the data processing system 200 includes at least one data processor 202 connected with at least one computer-readable medium such as a memory that stores computer readable program instructions (software (SW)) configured to perform all or some of the various operations described above. For example, the computer readable program instructions 202A can be configured to execute the functionality of the key generation tool 102A and be connected with the client computer 110 via a suitable interface (I/F) 206 that can include one or both of a wired interface and a wireless interface (e.g., an optical and/or a radio frequency (RF) interface). The interface 206 may be considered to form a part of an enterprise intranet (e.g., a LAN or WLAN) but can also include an ability to connect to a wide area network (WAN) such as the internet.

A memory 204 is configured to include the key management store 102B and can record for individual users, for example, an encrypted key pair of a user, a list of servers associated with the user and other user-related information including, as non-limiting examples, the user's (e.g., intranet) password(s), the MAC address (and/or other unique identifying information) of the user's access device (the client computer 110 however embodied) and an enterprise ID of the user. The data processor 202 is also interfaced with the servers 104 that could be local or remote relative to the location of the data processor 202. The data processor 202 is also interfaced with the enterprise directory 106 (that could in some embodiments be resident in the memory 204). In some embodiments the computer readable program instructions 202A could also be resident in the memory 204.

If the functionality of the key generation tool 102A is not included in the local SW 202A it could be resident in a separate processor or system or sub-system that is co-located with the data processor 202, or that is located remotely from data processor 202 and connected via one or more suitable secure interface(s).

In some non-limiting embodiments the functionality of the key generation tool 102A could be implemented as a service that is subscribed to by the enterprise. In this case the key generation tool 102A can be locally installed and operated or the key generation tool 102A can be remotely connected to and operated.

In some embodiments the data processing system 200 can be physically located and instantiated at an enterprise, while in some other embodiments some or all of the data processing system 200 and related modules and sub-systems and memories (e.g., memory 204) can be implemented as a virtual system or systems hosted in the cloud either by the enterprise itself or by a third party cloud provider.

It should thus be realized that, and in general, any computer program product that implements the embodiments of this invention including but not limited to the key generation tool 102A can be embodied on the same platform, or the computer program product and the key generation tool 102A can be embodied on different platforms, where the platform or platforms can comprise one or both of a hardware instantiation or a virtual, cloud-based instantiation.

In the various examples of the embodiments of this invention the user can access the target server either through a modified SSH client (such as a modified version of PuTTY, i.e., a version having a capability to connect to a directory server and/or use the user's intranet password and the computer MAC address to decode a private key). Alternatively the user can access the network through a jump server (or jump host), i.e., a special-purpose computer on a network typically used to manage devices in a separate security zone. This embodiment is particularly beneficial if there is no opportunity to modify the SSH client through which the user accesses the server.

It should be realized that the teachings of this invention are applicable not only to SSH connections but also to other connections that are authenticated with keys (e.g., HTTPS).

The embodiments of this invention provide a method and computer program and a system that is implemented by or with at least one data processor, where the method provides enterprise identity management having improved enterprise user and password capability that uniquely identifies an employee of the enterprise.

In accordance with the embodiments of this invention an enterprise user can own a set of key pairs and, whenever the user's enterprise password expires, all of the key pairs of the set of key pairs can be refreshed.

Referring to FIG. 3, in one aspect thereof the embodiments of this invention provide a method, implemented by at least one data processor, that comprises (Block 3A) forming a key pair for a user. The key pair comprises a public key and a private key that is unique to the user (in the enterprise) and that is encrypted using a passphrase comprised of an enterprise password of the user and an identification that uniquely identifies in the enterprise a device by which the user accesses the enterprise. The method further comprises (Block 3B) storing the private key in the user device and storing the public key in at least one enterprise server that is accessed by the user.

In the method the identification can comprise a medium access control (MAC) address of the device, and the user can access the enterprise server via a secure shell (SSH) client.

Referring to Block 3C the method can further comprise providing the private key from the user device to the SSH client in conjunction with the password and the identification, decrypting the private key to obtain the decrypted password and the identification, and allowing the user to access the enterprise server only if the decrypted password and the identification match the password and the identification provided with the private key.

Referring to Block 3D, the method can further comprise storing in a memory user information comprising at least the encrypted private key, the public key, the identification of the device, and a list of enterprise servers that are accessible by the user, the user information being associated with an enterprise user identification.

Referring to Block 3E, the method can further comprise, in response to a change in at least one of the enterprise password of the user and the identification that uniquely identifies the device, forming a new key pair for the user using the changed at least one of the enterprise password and the identification, and storing a resulting new private key in the user device and storing the resulting new public key in the enterprise server.

Referring to Block 3F, the method can further comprise, in response to a change in a status of the user in the enterprise, identifying from a list of servers those enterprise servers that the user could access, and removing the public key of the user from all enterprise servers in the list.

The present invention can also encompass a system and a computer program product configured to execute the method. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As such, various modifications and adaptations may become apparent to those skilled in the relevant arts in view of the foregoing description, when read in conjunction with the accompanying drawings and the appended claims. As but some examples, the use of other similar or equivalent secure connection systems, key pair generation algorithms and/or system architectures may be used by those skilled in the art. However, all such and similar modifications of the teachings of this invention will still fall within the scope of this invention.

What is claimed is:

1. A method implemented by at least one data processor, comprising:

receiving from a user device an identification that uniquely identifies in an enterprise the user device by which a user accesses at least one server of the enterprise, an enterprise password of the user associated with the user device, and a list of the enterprise's servers that are to be accessible by the user via the user device and a server access function;

forming a key pair for the user, the key pair comprising a public key and a private key that is unique to the user and that is encrypted using a passphrase comprised of the received enterprise password of the user verified by the enterprise's directory and the identification that uniquely identifies in the enterprise the user device by which the user accesses the enterprise's servers, where the encrypted private key is comprised of the passphrase;

storing the encrypted private key in the user device and storing the public key in each of the enterprise's servers that are identified in the received list of the enterprise's servers;

subsequently, when the user accesses the at least one enterprise server appearing in the list of the enterprise's servers, providing the encrypted private key, that was stored in the user device, from the user device to the server access function in conjunction with the password and the identification that uniquely identifies in the enterprise the user device by which the user accesses the enterprise;

decrypting at the server access function the encrypted private key using the provided password and the identification that uniquely identifies in the enterprise the user device to obtain from the decrypted private key the password and the identification that uniquely identifies in the enterprise the user device;

comparing the provided password and the identification that uniquely identifies in the enterprise the user device with the password and the identification that uniquely identifies in the enterprise the user device that are obtained from the decrypted private key; and granting the user access to the at least one enterprise server via the user device and the server access function only if the provided password and the identification that uniquely identifies in the enterprise the user device matches with the password and the identification that uniquely identifies in the enterprise the user device that are obtained from the decrypted private key.

2. The method as in claim 1, wherein the identification that uniquely identifies in the enterprise the user device by which the user accesses the enterprise comprises a medium access control (MAC) address of the user device.

3. The method as in claim 1, wherein the server access function is comprised of a secure shell (SSH) client.

4. The method as in claim 1, wherein the server access function is comprised of a jump server.

5. The method as in claim 1, further comprising, in response to a change in at least one of the enterprise password of the user and the identification that uniquely identifies the user device, forming a new key pair for the user using the changed at least one of the enterprise password and the identification, and storing a resulting new private key in the user device and storing the resulting new public key in the enterprise's servers identified in the list.

6. The method as in claim 1, further comprising, in response to a change in a status of the user in the enterprise, identifying from the list of servers those enterprise servers that the user could access, and removing the public key of the user from all of the enterprise's servers in the list.

7. The method of claim 1, further comprising storing in a key management store of the enterprise the user information comprising at least the encrypted private key, the public key, the identification of the user device, and the list of the enterprise's servers that are accessible by the user, the user information being associated with an enterprise user identification.

8. The method of claim 1, where the user device accesses the at least one enterprise server via a SSH protocol connection.

9. The method of claim 1, where the user device accesses the at least one enterprise server via an HTTPS protocol connection.

* * * * *